(12) United States Patent
Anbalagan et al.

(10) Patent No.: US 10,321,000 B2
(45) Date of Patent: Jun. 11, 2019

(54) METHODS AND SYSTEMS FOR AUTOMATICALLY SORTING DOCUMENTS USING A MULTI-FUNCTION DEVICE

(71) Applicant: XEROX CORPORATION, Norwalk, CT (US)

(72) Inventors: Ashok Raj Anbalagan, Chennai (IN); Angom Pradeep Master, Imphal West (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/696,218

(22) Filed: Sep. 6, 2017

(65) Prior Publication Data

US 2019/0075213 A1    Mar. 7, 2019

(51) Int. Cl.
  *H04N 1/00* (2006.01)
  *G06K 9/00* (2006.01)
(52) U.S. Cl.
  CPC ..... *H04N 1/00641* (2013.01); *G06K 9/00449* (2013.01); *G06K 9/00456* (2013.01); *G06K 9/00469* (2013.01); *G06K 9/00483* (2013.01); *H04N 1/00331* (2013.01); *H04N 1/00588* (2013.01); *H04N 1/00803* (2013.01); *G06K 2209/01* (2013.01); *H04N 2201/0094* (2013.01)

(58) Field of Classification Search
  None
  See application file for complete search history.

(56) References Cited

U.S. PATENT DOCUMENTS

| 5,054,621 A | 10/1991 | Murphy et al. |
| 6,363,164 B1 | 3/2002 | Jones et al. |
| 2009/0324105 A1* | 12/2009 | Tanaka ................... G06K 9/033 382/224 |
| 2014/0293367 A1* | 10/2014 | St Jacques, Jr. ... H04N 1/00005 358/474 |

* cited by examiner

*Primary Examiner* — Lennin R Rodriguezgonzalez

(57) ABSTRACT

The disclosure discloses methods and systems for automatically sorting a plurality of pages of a document by a multi-function device. The device comprises a document feeder, a document swapper and a document collector. The multi-function device receives a request to sort the plurality of pages in accordance with at least one sorting parameter. The multi-function device scans the pages and identifies one or more character fields for each of the scanned pages and executes a plurality of page swap cycles between the document feeder, the document swapper, and the document collector until each of the scanned pages are sorted based on the at least one sorting parameter. The sorting is performed by comparing the character fields for each of the scanned pages, a first subset of scanned pages are placed in the document swapper and a second subset is placed in the document collector in each page swap cycle.

15 Claims, 13 Drawing Sheets

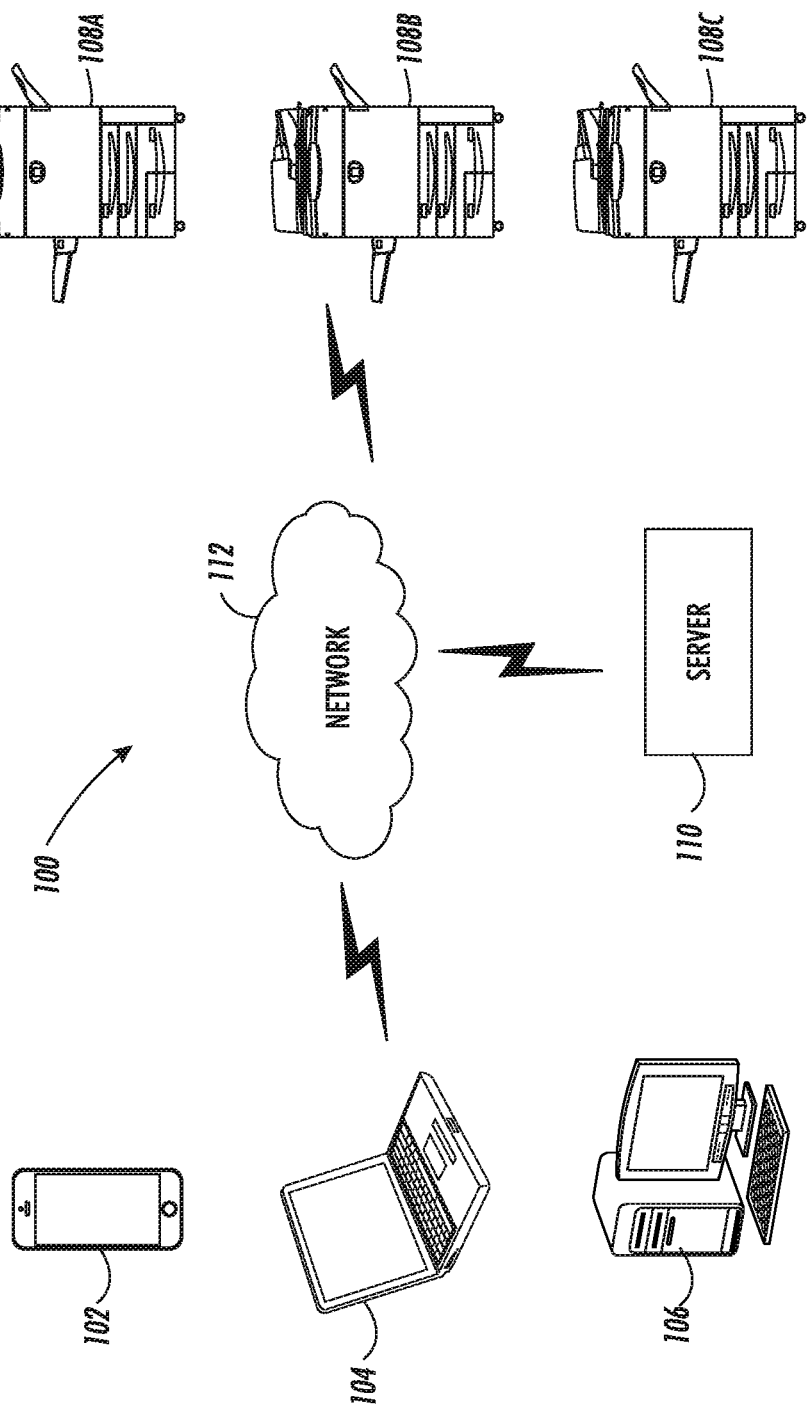

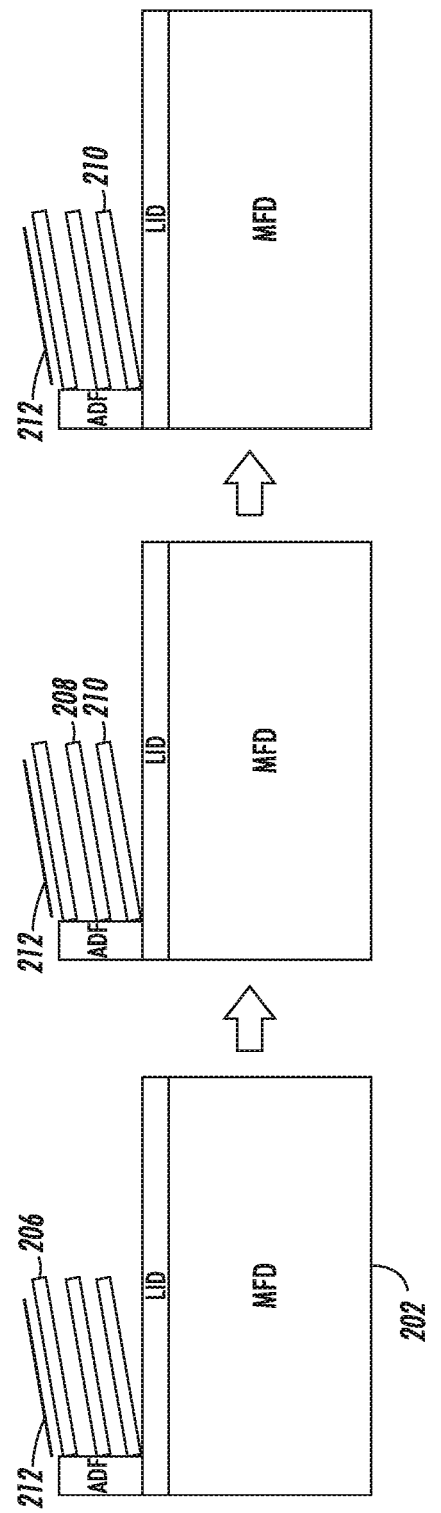

| DOCUMENT FEEDER /902 | DOCUMENT SWAPPER /904 | DOCUMENT COLLECTOR /906 |
|---|---|---|
| en, es, en, fr, es, fr, en | | |
| es, en, fr, es, fr, en | | en |
| en, fr, es, fr, en | Es | en |
| fr, es, fr, en | es | en, en |
| es, fr, en | fr, es | en, en |
| fr, en | es, fr, es | en, en |
| en | fr, es, fr, es | en, en |
| | fr, es, fr, es | en, en, en |
| es, fr, es, fr | | en, en, en |
| fr, es, fr | | es, en, en, en |
| es, fr | fr | es, en, en, en |
| fr | fr | es, es, en, en, en |
| | fr, fr | es, es, en, en, en |
| fr, fr | | es, es, en, en, en |
| fr | | fr, es, es, en, en, en |
| | | fr, fr, es, es, en, en, en |

FIG. 9

METHODS AND SYSTEMS FOR AUTOMATICALLY SORTING DOCUMENTS USING A MULTI-FUNCTION DEVICE

TECHNICAL FIELD

The presently disclosed embodiments relate to a multi-function device, and more particularly, to methods and systems for automatically sorting documents using a multi-function device.

BACKGROUND

There are enormous amounts of documents being processed frequently in private offices, educational institutions, public administrative offices, hospitals, and even homes. Usually, these documents have specific information fields, such as page numbers, language code, nationality information, region code, state code, country code, date, and the like, using which users manually sort or segregate the documents in a desired order. Examples of desired order include, but are not limited to, an ascending order, a descending order, alphabetically, or a combination thereof. The users can also sort/segregate the documents based on a multi-level criteria. For example, a set of documents can be first manually sorted by an ascending order of date and then alphabetically by country codes. Since the document sizes are usually large and the sorting activity is needed frequently, any sorting requires considerable amount of human effort to arrange and group the documents. Also, there are chances of human error while performing the sorting activity.

A multi-function device (MFD) provides multiple functionalities, such as printing, scanning, copying, faxing; all incorporated in a single device. These functionalities are now being extended to include document finishing related activities, such as sorting, collating, stacking, stapling, binding, stitching, folding, cutting, and hole punching. There exists a need to further extend the MFD's functionalities to automate the process of document sorting.

SUMMARY

The present disclosure discloses a computer-implemented method for automatically sorting a plurality of pages of a document, the method being performed by a multi-function device, the multi-function device comprising a document feeder, a document swapper, and a document collector. At the multi-function device, a user request is received to sort the plurality of pages of the document, the document being placed by a user in the document feeder, wherein the user request comprises at least one sorting parameter. Next, the plurality of pages placed in the document feeder are scanned. The multi-function device identifies one or more character fields corresponding to the at least one sorting parameter in each of the scanned pages, the identification being performed by at least one of an optical character recognition technique and a form awareness technique. The one or more character fields corresponding to each of the scanned pages are stored. The multi-function device executes a plurality of page swap cycles between the document feeder, the document swapper, and the document collector, wherein the page swap cycles are executed by comparing the one or more character fields of each of the scanned pages. The execution comprises placing N pages from the scanned pages in the document feeder to the document swapper, placing M pages from the scanned pages in the document feeder to the document collector, comparing the one or more character fields of the N pages in the document swapper with the one or more character fields of the M pages in document collector, for each swap cycle, placing the N pages and the M pages back to the document feeder in an identified sequence corresponding to the at least one sorting parameter, and repeating the page swap cycles until each of the scanned pages are sorted in the document feeder based on the at least one sorting parameter.

Further, the present disclosure discloses a computer-implemented method for automatically sorting a document comprising $L_1$ pages, the method being performed by a multi-function device, the multi-function device comprising a document feeder, a document swapper and a document collector. At the multi-function device, a user request is received to sort the $L_1$ pages of the document based on at least one digital content input comprising $L_2$ pages, the document being placed by a user in the document feeder, the digital content input being electronically received by the multi-function device over a network. Next, the image layout of each of the $L_2$ pages of the digital content input is analyzed and one or more identifiers for each of the $L_2$ pages are serially stored, the one or more identifiers corresponding to a sequential order of the $L_2$ pages in the digital content input. The $L_1$ pages placed in the document feeder are scanned at the multi-function device. The image layout of each of the $L_2$ pages is compared with each of the $L_1$ pages and assigning the one or more identifiers of each of the $L_2$ pages to each of the $L_1$ pages when a comparison is successful. Further, a plurality of page swap cycles is executed between the document feeder, the document swapper, and the document collector, wherein the page swap cycles are executed by comparing the one or more identifiers of each of the $L_1$ pages. The execution comprises: placing N pages from the $L_1$ pages in the document feeder to the document swapper, placing M pages from the $L_1$ pages in the document feeder to the document collector, comparing the one or more identifiers of the N pages in the document swapper with the one or more identifiers of the M pages in document collector, for each swap cycle, placing the N pages and the M pages back to the document feeder in an identified sequence, and repeating the page swap cycles until a sequential order of each of the $L_1$ pages in the document feeder matches the sequential order of $L_2$ pages in the digital content input.

Additionally, the present disclosure discloses a system for automatically sorting a plurality of pages of a document by a multi-function device, an assembly of the multi-function device comprising a document feeder, a document collector and an additional document swapper. The system comprises a user interface module, a scan module, a document pre-processing module, a sorting engine, and a memory module. The user interface module is configured to receive a user request to sort the plurality of pages of the document, the document being placed by a user in the document feeder, wherein the user request comprises at least one sorting parameter. The scan module is configured to scan the plurality of pages placed in the document feeder. The document pre-processing module is configured to identify one or more character fields corresponding to the at least one sorting parameter in each of the scanned pages, the identification being performed by at least one of an optical character recognition technique and a form awareness technique. The sorting engine is configured to execute a plurality of page swap cycles between the document feeder, the document swapper, and the document collector until each of the scanned pages are sorted based on the at least one sorting parameter. Lastly, the memory module is configured to store the one or more character fields corresponding to each of the scanned pages.

Moreover, the present disclosure discloses a system for automatically sorting a plurality of pages of a document by a multi-function device, an assembly of the multi-function device comprising a document feeder, a document collector and an additional document swapper. The system comprises a user interface module, a scan module, a document pre-processing module, a sorting engine, and a memory module. The user interface module is configured to receive a user request to sort the plurality of pages of the document, the document being placed by a user in the document feeder, wherein the user request comprises at least one sorting parameter. The scan module is configured to scan the plurality of pages placed in the document feeder. The document pre-processing module is configured to identify one or more character fields corresponding to the at least one sorting parameter in each of the scanned pages, the identification being performed by at least one of an optical character recognition technique and a form awareness technique. The memory module is configured to store the one or more character fields corresponding to each of the scanned pages. The sorting engine is configured to execute a plurality of page swap cycles between the document feeder, the document swapper, and the document collector, wherein the page swap cycles are executed by comparing the one or more character fields of each of the scanned pages. The execution comprises: placing N pages from the scanned pages in the document feeder to the document swapper, placing M pages from the scanned pages in the document feeder to the document collector, comparing the one or more character fields of the N pages in the document swapper with the one or more character fields of the M pages in document collector, for each swap cycle, placing the N pages and the M pages back to the document feeder in an identified sequence corresponding to the at least one sorting parameter, and repeating the page swap cycles until each of the scanned pages are sorted in the document feeder based on the at least one sorting parameter.

The present disclosure discloses a system for automatically sorting a document comprising $L_1$ pages, the sorting being performed by a multi-function device, an assembly of the multi-function device comprising a document feeder, a document collector and an additional document swapper. The system comprises a user interface module, a scan module, a document pre-processing module, and a sorting engine. The user interface module is configured to receive a user request to sort the $L_1$ pages of the document based on at least one digital content input comprising $L_2$ pages, the document being placed by a user in the document feeder, the digital content input being electronically received by the multi-function device over a network. The scan module is configured to scan the $L_1$ pages placed in the document feeder. The document pre-processing module is configured to: analyse the image layout of each of the $L_2$ pages of the digital content input and serially store one or more identifiers for each of the $L_2$ pages in a memory module, the one or more identifiers corresponding to a sequential order of the $L_2$ pages in the digital content input, and compare the image layout of each of the $L_2$ pages with each of the $L_1$ pages and assign the one or more identifiers of each of the $L_2$ pages to each of the $L_1$ pages when a comparison is successful. The sorting engine is configured to execute a plurality of page swap cycles between the document feeder, the document swapper, and the document collector, wherein the page swap cycles are executed by comparing the one or more identifiers of each of the $L_1$ pages. The execution comprises: placing N pages from the $L_1$ pages in the document feeder to the document swapper, placing M pages from the $L_1$ pages in the document feeder to the document collector, comparing the one or more identifiers of the N pages in the document swapper with the one or more identifiers of the M pages in document collector, for each swap cycle, placing the N pages and the M pages back to the document feeder in an identified sequence, and repeating the page swap cycles until a sequential order of each of the $L_1$ pages in the document feeder matches the sequential order of $L_2$ pages in the digital content input.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 1 illustrates an exemplary overall system configured for automatically sorting documents, according to an aspect of the disclosure.

FIGS. 2A-2C illustrate the components of a multi-function device, according to an embodiment of the present disclosure.

FIG. 9 illustrates a table with a second example for automatically sorting a plurality of pages of a document based on a language code.

DESCRIPTION

Figure 2A:
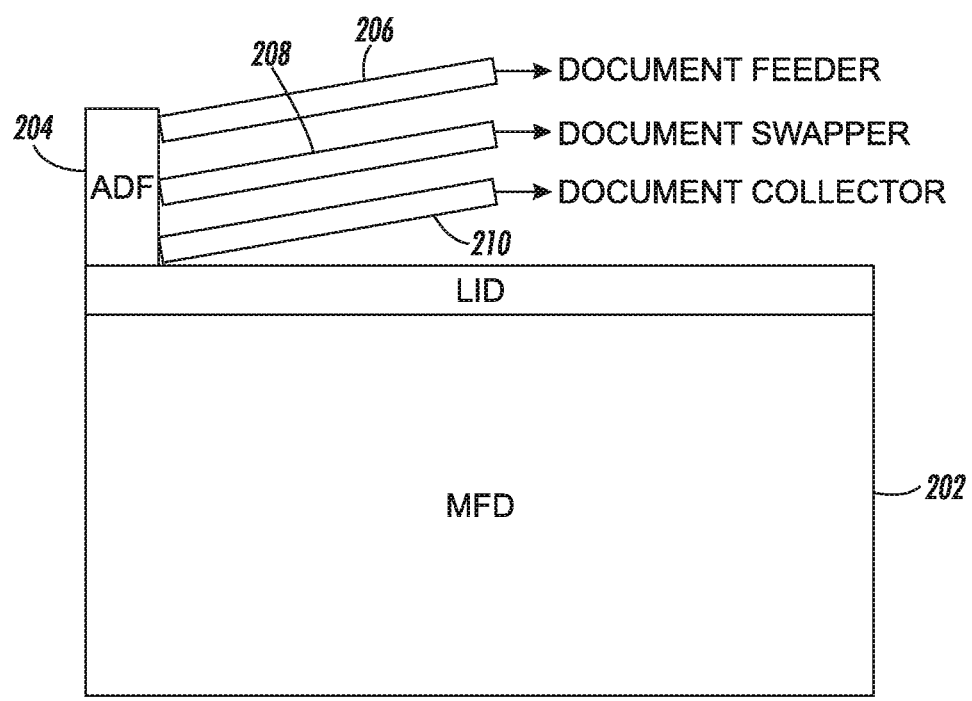

The following detailed description is provided with reference to the figures. Exemplary, and in some cases preferred, embodiments are described to illustrate the disclosure, not to limit its scope, which is defined by the claims. Those of ordinary skill in the art will recognize a number of equivalent variations in the description that follows without departing from the scope and spirit of the disclosure.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "document" relates to a content that is a physical copy/hard copy of an electronic version. The document includes one or more pages, wherein a page is a physical sheet of paper. In other words, a collection of one or more pages together forms a single document. Further, the document can be scanned, copied, sorted or segregated manually or automatically.

The term "digital content" relates to a content in an electronic format and includes one or more pages. A digital content may correspond to any file format. Examples include, but are not limited to, PDF, HTML, PostScript, RTF, GIF, JPEG, TXT, DOC, DOCX, EPUB, PPT, PPTX, XLS, XLSX, Numbers, Pages, Keynote, and the like.

The term "sorting" refers to arranging the pages of a document in a predefined order. The predefined order is determined by one or more sorting parameters specified by a user, and it corresponds to arranging the pages in at least one of an ascending order, a descending order, an alphabetical order, a language, a similarity index, and a combination thereof. In context of the present disclosure, the term "sorting" can be interchangeably referred to as "segregating," "categorizing," "grouping," and the like.

The term "multi-function device" (MFD) refers to a single device that performs multiple separate functionalities, such as printing, scanning, copying, and faxing a document. The MFD device may participate in a network and communicate with various devices, users, or any combination thereof. In context of the present disclosure, an assembly of the MFD includes three mechanical plates (also called trays or slots); a document feeder, a document swapper, and a document collector. The "document feeder" is a plate where a user places a document comprising a plurality of pages. The "document swapper" is an intermediary mechanical plate between the document feeder and the document collector, and is used to perform a plurality of page swaps for sorting the document. The "document collector" is a plate where the sorted pages of the document are finally placed and is also used in conjunction to the document swapper to perform the plurality of page swaps.

A "user device" refers to a device that includes a processor/micro-controller and/or any other electronic component, or a device or a system that performs one or more operations according to one or more programming instructions. Examples of the user device include, but are not limited to, a desktop computer, a laptop, a personal digital assistant (PDA), a mobile phone, a smart-phone, a tablet computer, and the like.

A "user" is an individual who operates a user device and an MFD to perform specific functions. Examples of specific functions include, but are not limited to, initiating a sorting request for a document, providing one or more sorting parameters, providing one or more templates using which a sorting is executed, placing a document in a document feeder slot of an automatic document feeder (ADF), collecting the sorted document from the document collector, and the like.

A "sorting engine" is a module that executes one or more machine readable program instructions to process a document sorting request. The sorting engine is configured to be integrated with an MFD. In another embodiment of the disclosure, the sorting engine resides on a server and remotely controls the sorting related operations performed at one or more MFDs connected over a network.

Overview

Various embodiments of the present disclosure describe systems and methods for automatically sorting a plurality of pages of a document using a multi-function device (MFD). The assembly of the MFD includes an additional plate: a document swapper which is placed between a document feeder and a document collector. The MFD receives a user request to sort the plurality of pages in accordance with at least one sorting parameter. The MFD scans the plurality of pages and identifies one or more character fields for each of the scanned pages. The MFD then executes a plurality of page swap cycles between the document feeder, the document swapper, and the document collector until each of the scanned pages are sorted based on the at least one sorting parameter. The sorting is performed by comparing the one or more character fields for each of the scanned pages, wherein a first subset of scanned pages are placed in the document swapper and a second subset is placed in the document collector in each page swap cycle.

Exemplary Overall System

FIG. 1 illustrates an exemplary overall system 100 configured for automatically sorting a document. The overall system 100 includes a plurality of user devices (102, 104, 106), a plurality of multi-function devices (108a, 108b, 108c), and a server 110; each connected over a network 112. In an embodiment of the disclosure, the server 110 installs a sorting engine on each of the plurality of multi-function devices (hereinafter referred to as an MFD) wherein the sorting engine is configured to sort a document according to one or more sorting parameters. In another embodiment of the disclosure, the sorting engine resides on the server 110 and remotely transmits one or more instructions to an MFD to initiate and process a sorting request for the document. The document comprises a plurality of physical sheets of one or more pages. The details of the sorting engine will be discussed later with reference to FIG. 4. The server 110 is also configured to monitor the performance of all MFDs. The server 110 may send regular software updates to the MFDs, probe the MFDs to send their current status, remotely control or configure the MFDs, and the like.

The user devices (102-106) may correspond to a desktop PC, a laptop, a workstation, a personal digital assistant, a mobile phone, a tablet, a server, and the like. A user provides a sorting request to an MFD either directly on the MFD's user interface or remotely via a user device. In addition, the user may share one or more templates with the MFD via a user device. The details of the one or more templates will be discussed with reference to FIG. 4.

The network 112 may include any software, hardware, or computer applications that can provide a medium to exchange signals or data in any of the formats known in the art, related art, or developed later. The network 112 may include, for example, one or more of the Internet, Wide Area Networks (WANs), Local Area Networks (LANs), analog or digital wired and wireless telephone Networks (e.g., a PSTN, Integrated Services Digital Network (ISDN), a cellular network, and Digital Subscriber Line (xDSL), Wi-Fi, radio, television, cable, satellite, and/or any other delivery or tunneling mechanism for carrying data. The network 112 may include multiple networks or sub-networks, each of which may include a wired or wireless data pathway. The network 112 may include a circuit-switched voice network, a packet-switched data network, or any other network able to carry electronic communications. For example, the network 112 may include networks based on the Internet protocol (IP) or asynchronous transfer mode (ATM), and may support voice using, for example, VoIP, Voice-over-ATM, or other comparable protocols used for voice, video, and data communications.

Components

Figure 2B:
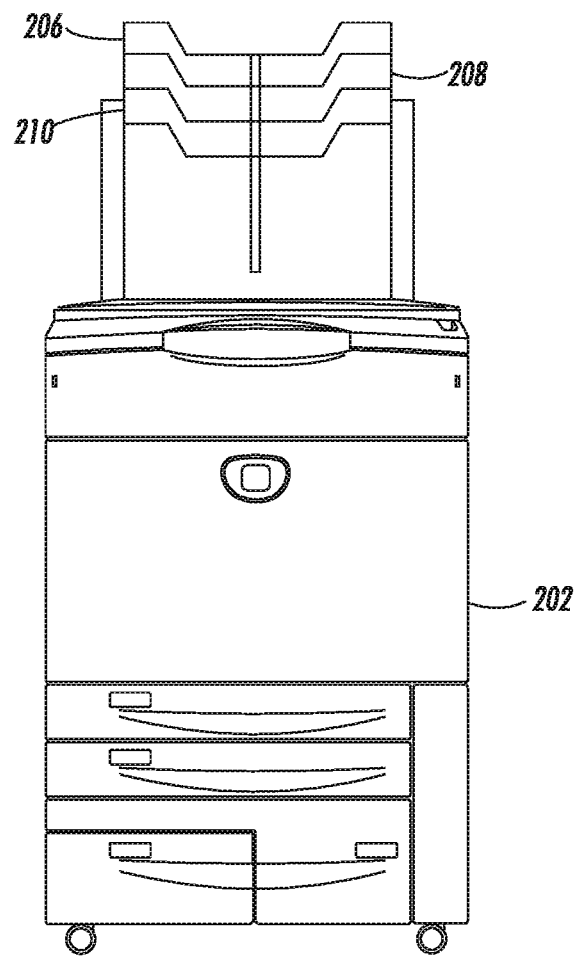

FIGS. 2A-2C illustrate the components of an MFD 202, according to an embodiment of the present disclosure. Typically, an automatic document feeder (ADF) of the traditional MFDs includes two mechanical slots or plates, namely: a feeder plate and a collector plate. The feeder plate is used to place physical sheets (pages) of one or more documents to be copied or scanned. The internal rotation mechanism of an MFD inputs the one or more documents within the MFD to perform the necessary actions, such as scanning or copying. Once the necessary actions are completed, the one or more documents (and additional copies of one or more documents, if a copy action was performed) are placed on the collector plate for subsequent manual collection. In accordance to the present disclosure, an additional plate is introduced between the feeder and the collector to facilitate a process of document sorting. In FIG. 2A, an MFD 202 corresponds to an MFD of the present disclosure. An ADF 204 of the MFD 202 includes a document feeder 206, a document collector 210, and an additional plate of a document swapper 208. In an embodiment of the disclosure, the document swapper 208 is integrated with an existing motor-wheel (or equivalent) assembly of the document feeder 206 and the document collector 210. In such a scenario, the document swapper 208 is operated with the existing assembly. In another embodiment of the disclosure, one or more new motor-wheel (or equivalent) hardware is introduced in the MFD 202 to support the newly added mechanical plate of the document swapper 208. In both the scenarios, the document swapper 208 coordinates with the document feeder 206 and the document collector 210 to perform a sorting process. FIG. 2B is an exemplary pictorial representation of the MFD 202 with the three mechanical plates, in accordance with the present disclosure. In an alternate embodiment, the placement of the document swapper 208 can be after the document collector 210, i.e., the sequence of plates can be: the document feeder 206, the document collector 210, finally followed by the document swapper 208.

In FIG. 2C, a document 212 to be sorted is first placed in the document feeder 206. The document 212 comprises a plurality of pages, wherein the plurality of pages are loose sheets of papers and are not bound together by staples, paper clips, glue, and the like. Further, the plurality of papers are scrambled and are not in any specific sequential order, thereby necessitating implementation of a sorting process. During a sorting process, the MFD 202 executes one or more instructions to direct the document feeder 206, the document swapper 208, and the document collector 210 to perform a plurality of page swap cycles until each of the plurality of pages of the document 212 are sorted in a predefined order. Examples of the predefined order include, but are not limited to, an ascending order, a descending order, an alphabetical order, a language, a similarity index, and a combination thereof.

Hardware Assembly

Figure 3A:
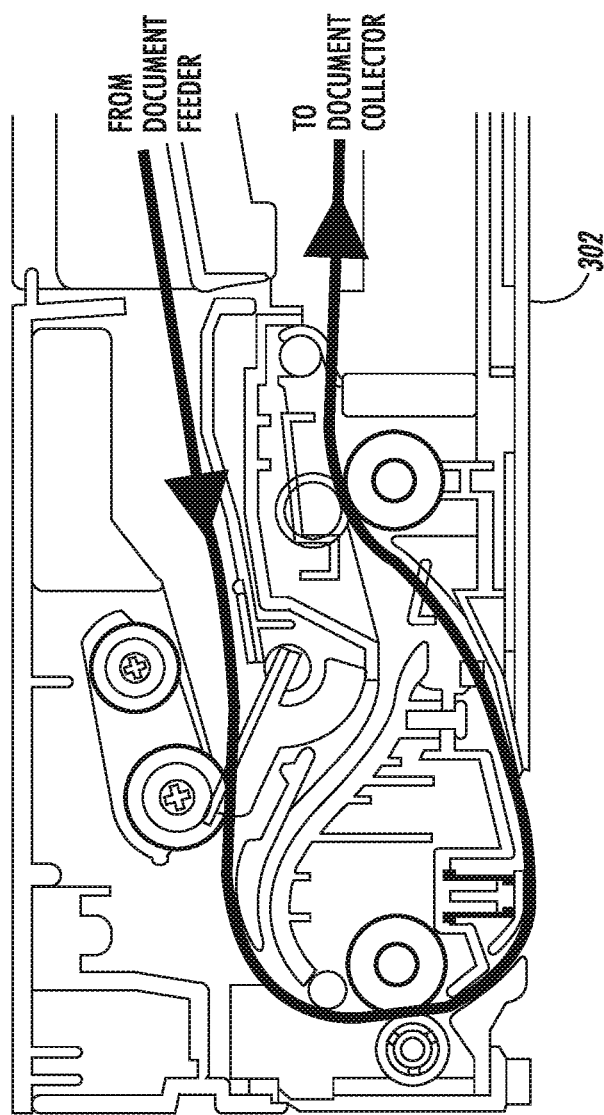
FIG. 3A illustrates the hardware assembly of a multi-function device, according to prior art.

FIG. 3A illustrates the hardware assembly of a multi-function device, according to prior art. The multi-function device of prior art includes an ADF 302 that supports a document feeder and a document collector. The ADF 302 includes one or more motor-wheel assembly using which a document fed in the document feeder is pulled in, one of a printing, scanning, or copying action is performed on the document, and the output document is placed in the document collector. In the ADF 302 of prior art, the output document cannot be retracted from the document collector back to the document feeder. In other words, there is a unidirectional flow of document pages from the document feeder to the document collector, and not vice versa.

Figure 3B:
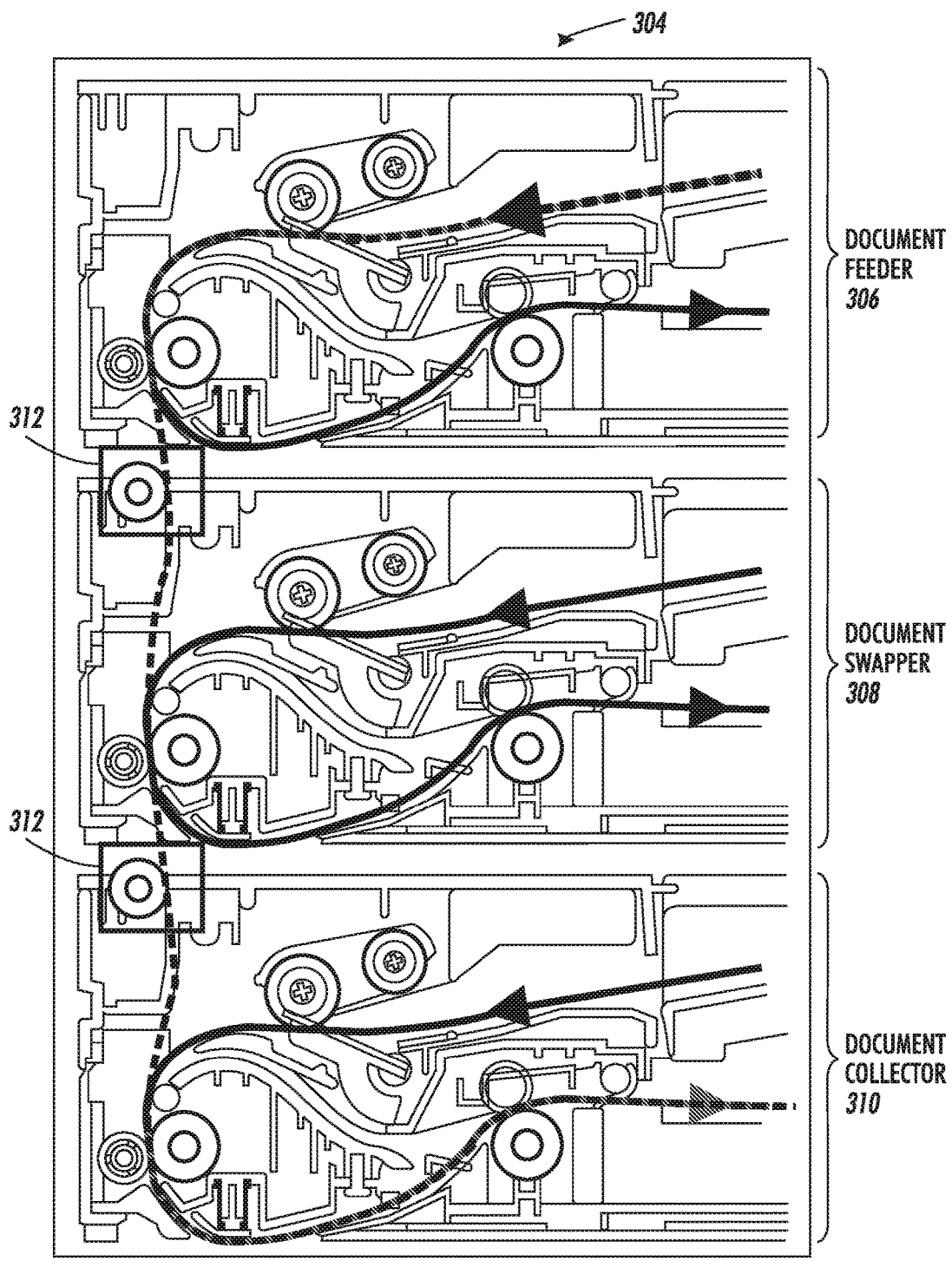
FIGS. 3B-3C illustrate the hardware assembly of a multi-function device, according to an embodiment of the present disclosure.
Figure 3C:
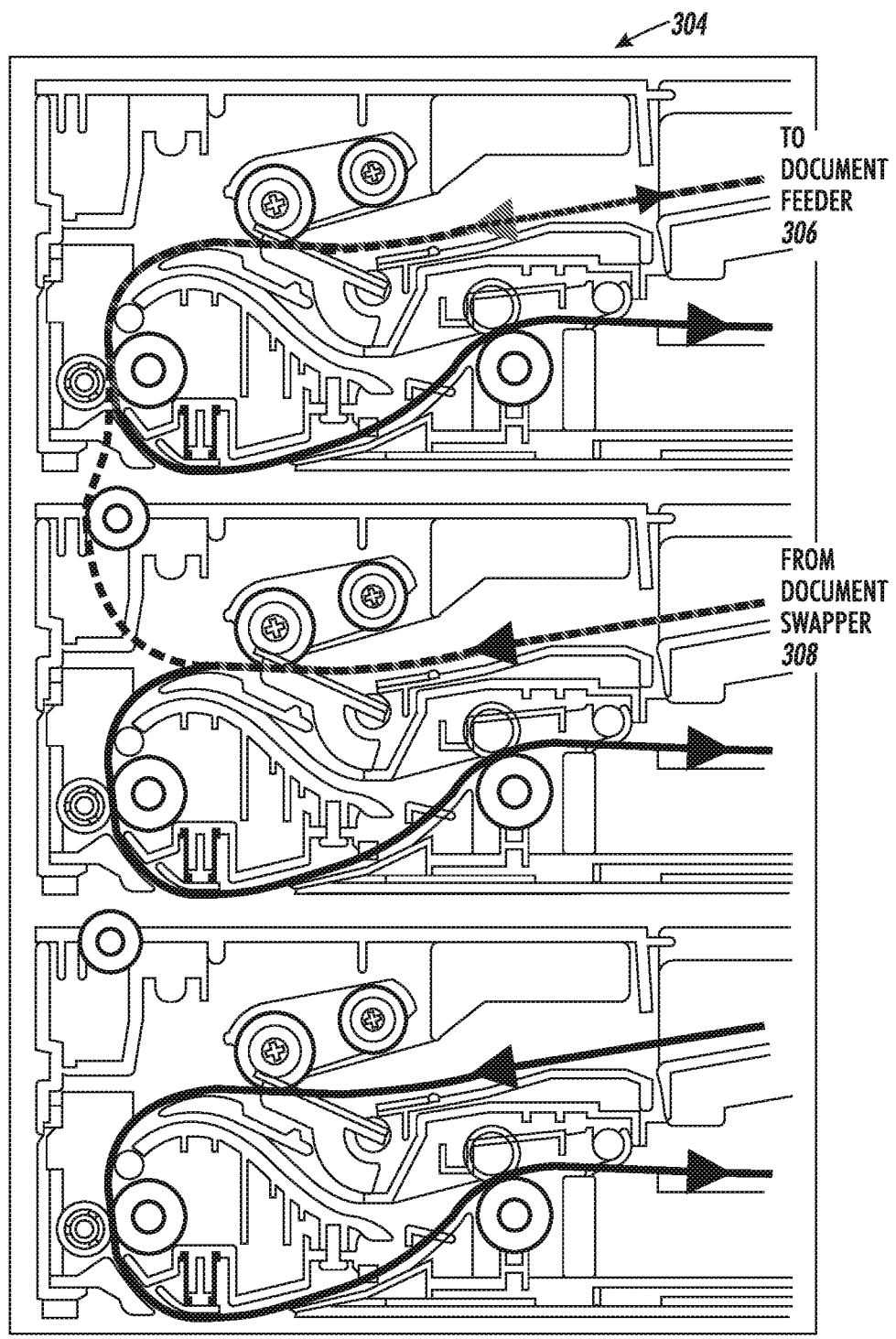

FIGS. 3B and 3C illustrate the hardware assembly of a multi-function device, according to an embodiment of the present disclosure. In an MFD 304 of FIG. 3B, the internal mechanism of the ADF 302 (prior art) is replicated thrice, one each for the three plates. Thereafter, the three plates are joined using additional motor-wheels 312 for coordinated functionalities. A document feeder 306 of the present disclosure facilitates feeding of a document into the MFD 304 as well as retracting the document out, i.e., a bi-directional flow of document pages is supported within the document feeder 306. The same functionality is supported for the other two plates: a document swapper 308 and a document collector 310. Further, a bi-directional flow of document pages is supported between the three plates (in addition to within the plates) and the motor-wheels 312 guide the flow of document pages. Therefore, using the bi-directional flow, a plurality of swap/retract cycles are performed in a singular plate as well as between the three plates in multiple orders (shown by a dotted line), thereby facilitating sorting of document pages. FIG. 3C illustrates an exemplary flow of document pages (shown by a dotted line) from the document swapper 308 back to the document feeder 306. Further, the MFD 304 includes a scanner (not shown in FIGS. 3B-3C) and a bi-directional flow of document pages is supported between the scanner and all three plates. Particularly, the document placed in the document feeder 306 can be pulled into the scanner, and the scanned pages can be placed back to the document feeder 306 for subsequent sorting operations.

System Modules

Figure 4:
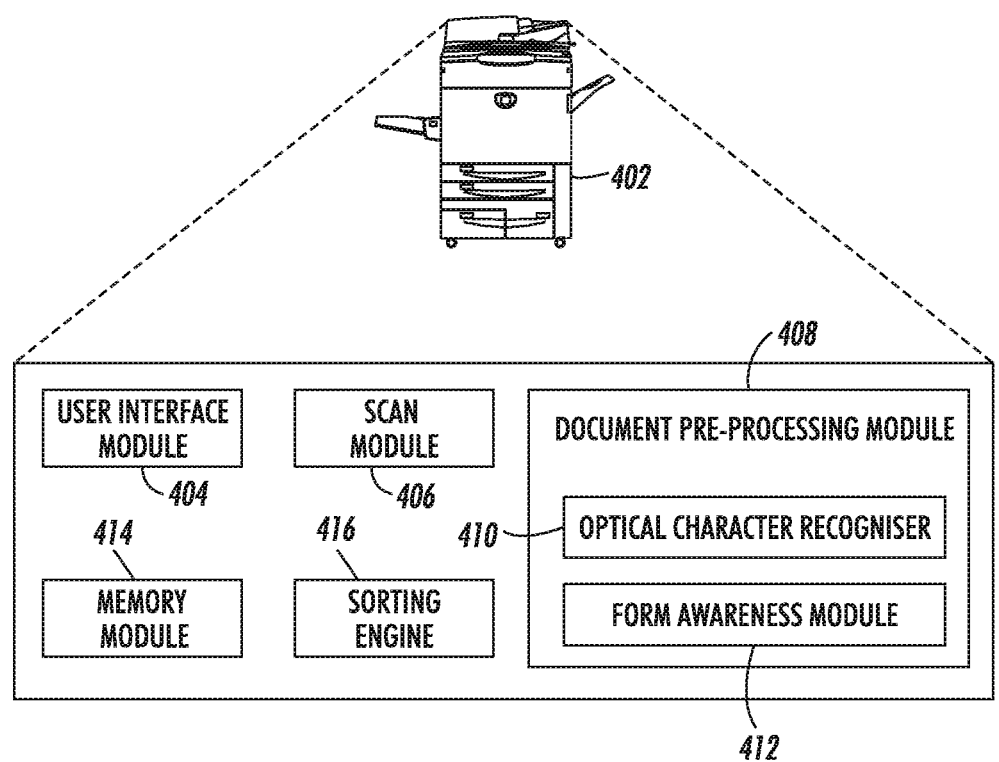
FIG. 4 illustrates a block diagram of a multi-function device, according to an embodiment of the present disclosure.

FIG. 4 illustrates a block diagram of an MFD 402, according to an embodiment of the present disclosure. The MFD 402 will now be discussed in conjunction with FIG. 2, such that the MFD 202 of FIG. 2 corresponds to the MFD 402 of FIG. 4. The MFD 402 includes a user interface module 404, a scan module 406, a document pre-processing module 408, a memory module 414, and a sorting engine 416, all bi-directionally connected over one or more data bus (not shown). The user interface module 404 includes a panel using which a user interacts with the MFD 402. The panel can be operated by means of arrow keys, an alphanumeric/number keypad, or a touchscreen display. The user interface module 404 displays a plurality of options that a user may select. Examples of the options include a scan option, a copy option, a fax option, and the like. In accordance with the present disclosure, the options also include a "sort option" which when selected initiates the process of sorting a document. The user first places a plurality of pages of a document in the document feeder 206 of the MFD 402 and requests to sort the document by selecting the sort option from the user interface module 404. On receipt of user request, the user interface module 404 instructs the user to specify at least one sorting parameter on the basis of which the plurality of pages will be sorted or arranged. Examples of the at least one sorting parameter include, but are not limited to, a page number, a date, a language, a string, and a code. The sorting parameter also specifies the order for sorting, i.e., an ascending order, a descending order, an alphabetical order, a language, a similarity index, and a combination thereof. The user interface module 404 displays appropriate selectable options for the user to specify the at least one sorting parameter. In another embodiment of the disclosure, the user may send a sort request to the MFD 402 remotely via a user device. In such a scenario, the user first connects with the MFD 402 over the network 112 and specifies the at least one sorting parameter in a sorting request using the user device. When the MFD 402 remotely receives the sorting request, the request gets processed.

The scan module 406 of the MFD 402 is configured to scan the plurality of pages of the document placed in the document feeder 206. The plurality of scanned pages are stored in the memory module 414.

The scanned pages are then fed to the document pre-processing module 408 which is configured to identify one or more character fields in each of scanned pages corresponding to the at least one sorting parameter. Examples of the one or more character fields include, but are not limited to, a numeric value, an alphanumeric string, a code, a string, one or more language identifiers, and the like. The numeric value may correspond to a page number, a date, and the like. In an embodiment of the present disclosure, the document pre-processing module 408 includes an optical character recognizer 410 which performs an optical character recognition by converting typed, handwritten or printed text in each of the scanned pages into a machine-encoded text. The optical character recognizer 410 analyzes the structure of each of the scanned image of the pages. Then, the individual elements, such as blocks of texts, tables, images, and the like are identified. The words and characters in the blocks of texts and tables are identified and singled out. The optical character recognizer 410 then compares the words and characters with a set of pattern images and applies hypotheses to accurately recognize each character. During this process, the optical character recognizer 410 extracts the one or more character fields (such as page numbers, codes, dates, language, and the like) corresponding to the at least one sorting parameter. Further, the optical character recognizer 410 is configured to identify a plurality of font types, languages and dictionary support. For example, the optical character recognizer 410 examines the scanned pages to identify the language by comparing the frequency of English and non-English words. In another example, the optical character recognizer 410 analyzes a subset of strings within each scanned pages to ascertain the language. It should be understood to a person skilled in the art that a plurality of schemes can be used by the optical character recognizer 410 to identify the one or more character fields. The one or more character fields are stored in the memory module 414 as an array. For example, in case there are five pages, an array of A[0] to A[4] is created for storing the one or more character fields of each page. In an embodiment of the disclosure, a correspondence between the one or more character fields and each of the scanned pages is also maintained in the memory module 414.

In another embodiment of the disclosure, the user provides one or more templates for identifying the one or more character fields. The one or more templates represent a layout of the scanned pages and denotes the location of the one or more character fields within the scanned pages. For example, the one or more templates may signify that a page number (one or more character fields) is present in a bottom left section of each of the scanned pages. In another example, the one or more templates may signify that a date (one or more character fields) is mentioned in a left hand side column on the top corner while a country code is on bottom right in the footer. Therefore, there can be a plurality of locations where the one or more characters are placed in each of the scanned pages. A form awareness module 412 of the document pre-processing module 408 is configured to analyze each of the scanned pages in light of the one or more templates. Instead of processing the entire scanned page, the form awareness module 412 examines the layout of each of the scanned pages and selects only the portion specified in the one or more templates. The form awareness module 412 then identifies the one or more character fields from the selected portion. In another embodiment of the disclosure, the form awareness module 412 sends the selected portion to the optical character recognizer 410 to identify the words/numbers/characters which together constitute the one or more character fields.

In an embodiment of the disclosure, the MFD 402 stores the one or more templates in the memory module 414 and displays the one or more templates to the user for selection during placement of a sorting request. In another embodiment of the disclosure, the one or more templates are remotely stored on a server 110. In yet another embodiment, the one or more templates are supplied to the MFD 402 by a user via a user device. It may be apparent to a person skilled in the art that the one or more templates may be created in any of the programming languages known in the art.

The sorting engine 416 of the MFD 402 is configured to execute one or more machine readable instructions to perform a sorting operation on the scanned pages placed in the document feeder 206. The sorting operation corresponds to performing a plurality of page swap cycles between the document feeder 206, the document swapper 208, and the document collector 210, wherein the page swap cycles are executed by comparing the one or more character fields of each of the scanned pages. The sorting operation will now be discussed with reference to FIG. 5 and later with reference to FIG. 7.

Method Flowchart 1

Figure 5:
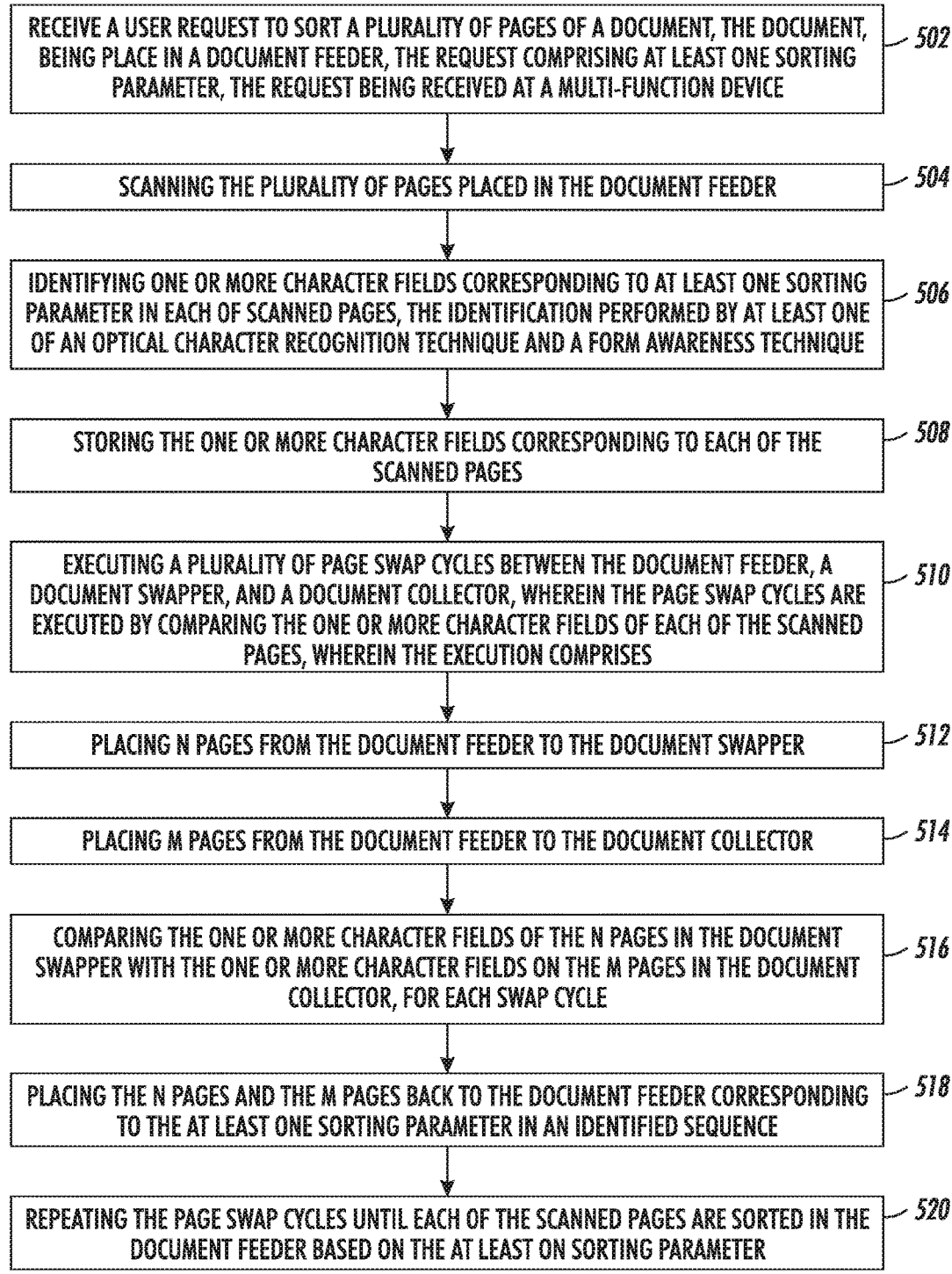
FIG. 5 illustrates a method for automatically sorting a plurality of pages of a document based on at least one sorting parameter, according to an embodiment of the disclosure.

FIG. 5 illustrates a method for automatically sorting a plurality of pages of a document based on at least one sorting parameter, according to an embodiment of the disclosure. The method will be discussed in conjunction with FIG. 2 and FIG. 4, such that the MFD 202 of FIG. 2 corresponds to the MFD 402 of FIG. 4. At 502, the MFD 402 receives a user request to sort a plurality of pages of a document. Prior to triggering the request, the user places the document in a document feeder 206 and in the request the user specifies at least one sorting parameter. Examples of the at least one sorting parameter may include, but are not limited to, at least one of a page number, a date, a language, a string, and a code. The at least one sorting parameter also includes the order for sorting, i.e., an ascending order, a descending order, an alphabetical order, a language, a similarity index, and a combination thereof. In an embodiment of the disclosure, the user may specify more than one sorting parameter and also the priority of each parameter to facilitate a multi-tier sorting. For example, the at least one sorting parameter may correspond to first sorting the plurality of pages based on a language and then based on page numbers. In this example, the user may specify the desired order of language, such as French>English>Spanish, and then indicate that within each language based sorted pages the order should be in ascending order of page numbers.

At 504, the MFD 402 sends the plurality of pages placed in the document feeder 206 to a scanner. In an embodiment of the disclosure, the MFD 402 picks each page from the plurality of pages, sends it the scanner which scans each page, and retracts the scanned pages to the document feeder 206. Essentially, after the plurality of pages are scanned, these are placed back to the document feeder 206 in an order originally placed by the user. In other words, in case the order of the plurality of pages get reversed during scanning, the MFD 402 arranges the plurality of pages back in the original order. Further, the digital copy of the scanned pages are stored by the MFD 402.

At 506, the MFD 402 identifies one or more character fields corresponding to the at least one sorting parameter in each of scanned pages. In an embodiment of the disclosure, the identification is performed by an optical character recognition technique. In another embodiment, the identification is performed by a form awareness technique using one or more templates. The one or more templates signify the layout of each of the scanned pages and the location of the one or more character within the scanned pages. Examples of the one or more character fields include, but are not limited to, a numeric value, an alphanumeric string, a code, a string, one or more language identifiers, and the like. At 508, the MFD 402 stores the one or more character fields corresponding to each of the scanned pages in form of an array.

At 510, the MFD 402 executes a plurality of page swap cycles between the document feeder 206, the document swapper 208, and the document collector 210, wherein the page swap cycles are executed by comparing the one or more character fields of each of the scanned pages. The execution is performed by the sorting engine 416 of the MFD 402. The specifics of the execution are discussed from 512 to 520.

At 512, the sorting engine 416 places N pages from the scanned pages kept in the document feeder 206 to the document swapper 208. In an embodiment of the disclosure, N=1 for the first swap cycle and is incremented by one for each subsequent swap cycle. In another embodiment, the value for N may vary. In other words, at the start of the page swap cycle, only one page is sent from the document feeder 206 to the document swapper 208. In the next cycle, two pages are send, and so on. Further, the pages are picked starting from the top of the stack of scanned pages in the document feeder 206.

At 514, the sorting engine 416 places M pages from the document feeder 206 to the document collector 210. In an embodiment, M=1 for each swap cycle. In another embodiment, the value of M may vary. At 516, the sorting engine 416 compares the one or more character fields of the N pages in the document swapper 208 with the one or more character fields of the M pages in document collector 210, for each swap cycle. At 518, the sorting engine 416 places the N pages and the M pages back to the document feeder 206 in an identified sequence corresponding to the at least one sorting parameter. The identified sequence will be discussed later with reference to FIG. 7.

At 520, the sorting engine 416 repeats the page swap cycles until each of the scanned pages are sorted in the document feeder 206 based on the at least one sorting parameter. Essentially, a single page swap cycle gets initiated when N pages and M pages are placed in the document swapper 208 and the document collector 210, respectively, and is completed when the N pages and M pages are returned to the document feeder 206 (in an identified sequence) after a series of comparison are made using on one or more character fields. Once all the scanned pages are sorted, the pages are sent to the document collector 210 from where a user can collect the sorted pages.

Exemplary Instruction Flow

Figure 7:
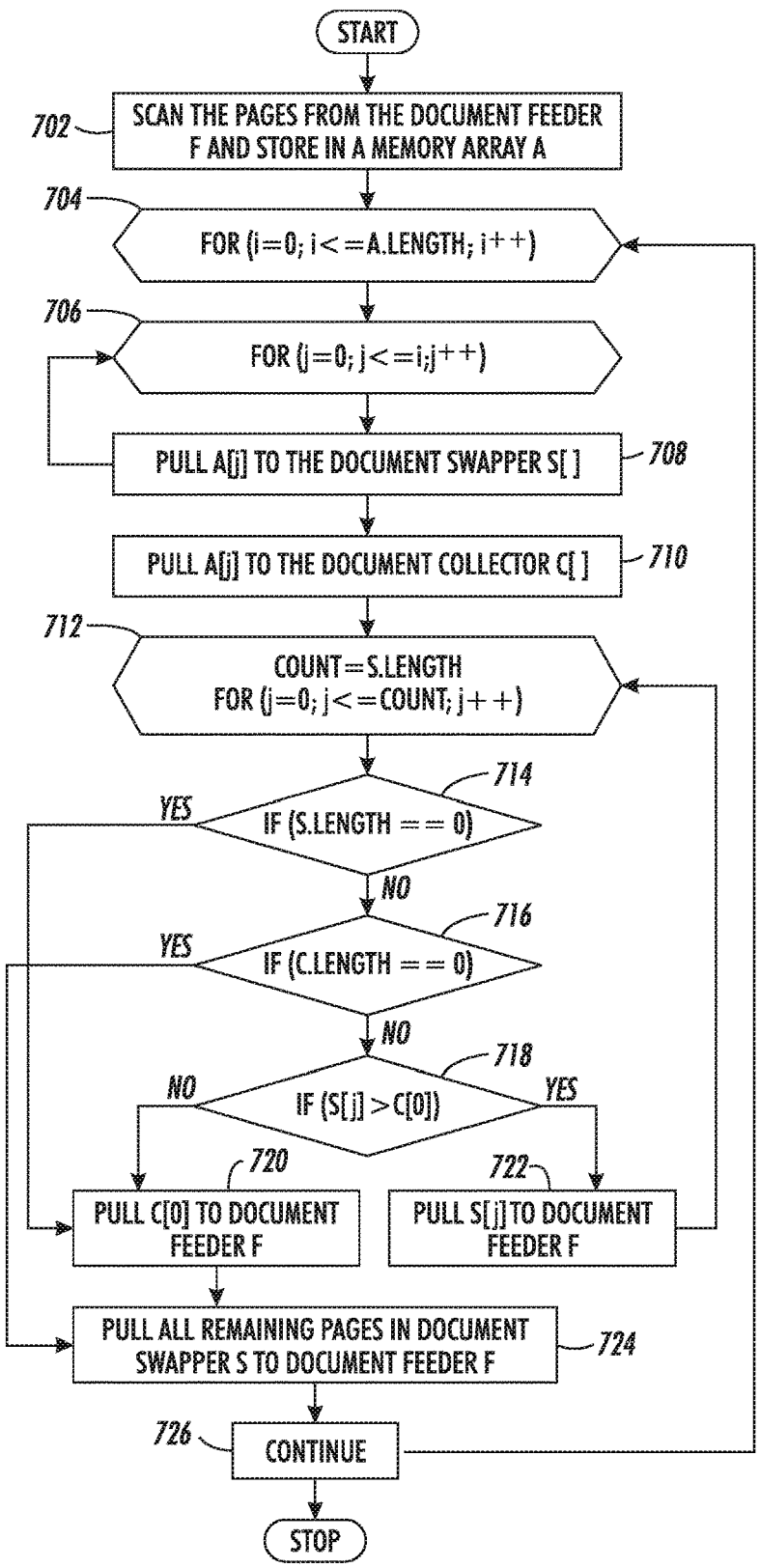
FIG. 7 illustrates the plurality of exemplary software instructions executed to automatically sort a plurality of pages of a document in an ascending order of page number, according to an embodiment of the disclosure.

FIG. 7 illustrates the plurality of exemplary software instructions executed to automatically sort a plurality of pages of a document in an ascending order of page number, according to an embodiment of the disclosure. FIG. 7 will be discussed with reference to FIG. 2 and FIG. 4, such that the MFD 202 of FIG. 2 corresponds to the MFD 402 of FIG. 4. The software instructions are executed by the sorting engine 416 and can be coded in any of the programming languages known in the art. In another embodiment of the disclosure, the software instructions are transmitted by the server 110 to the MFD 402. The software instructions of FIG. 7 relate to an exemplary sorting of document in an ascending order of page number. It should be apparent to a person skilled in the art that the instructions will vary when a different sorting parameter is used.

At 702, the MFD 402 scans the plurality of pages placed in the document feeder 206 and then extracts one or more character fields from each of the scanned page and stores in form of an array A[ ]. The storage is such that there is a one to one correspondence between the one or more character fields in each of the scanned pages. For example, if there are ten pages in the document feeder 206, the ten pages are scanned and a memory array A[0] to A[9] is created to represent each of the page. A[0] represents the top most page of the ten pages, while A[9] is the bottom most page. If the one or more character fields are the page numbers, for the top most page A[0], the corresponding page number imprinted may be #6, while for the bottom most page A[9] the corresponding page number may be #8. This association between the current order in which the scanned pages are placed in the document feeder 206 and the actual page numbers is maintained. In another embodiment, this association may be stored in a separate array (or in an equivalent memory representation scheme). Further, two other arrays are maintained to identify the sequence or order of the scanned pages being placed in or pulled from the document swapper 208 and the document collector 210. The array created for the document swapper 208 may be referred to as S[ ], while for the document collector 210 it may be referred to as C[ ].

Following is the sequence of instruction flow executed to sort the scanned pages in an ascending order of page numbers. It should be apparent to a person skilled in the art that the instructions will be varied depending on the sorting parameter and the comparison mechanism will change.

```
for (i=0; i<=A.length; i++)
{
for (j=0; j<=i; j++)
{
Pull A[j] to the document swapper S[ ];
}
Pull A[j] to the document collector C[ ];
for (j=0; j<= S.length; j++)
{
If (S.length == 0) then Pull C[0] to document feeder F, else (If
(C.length == 0) then Pull all remaining pages in document swapper S to
the document feeder F, else (If (S[j] > C[0]) then Pull S[j] to document
feeder F, else Pull C[0] to document feeder F);
}
}
```

A synopsis of the above instructions will now be discussed with reference to an example depicted in FIG. 8.

Figure 8:
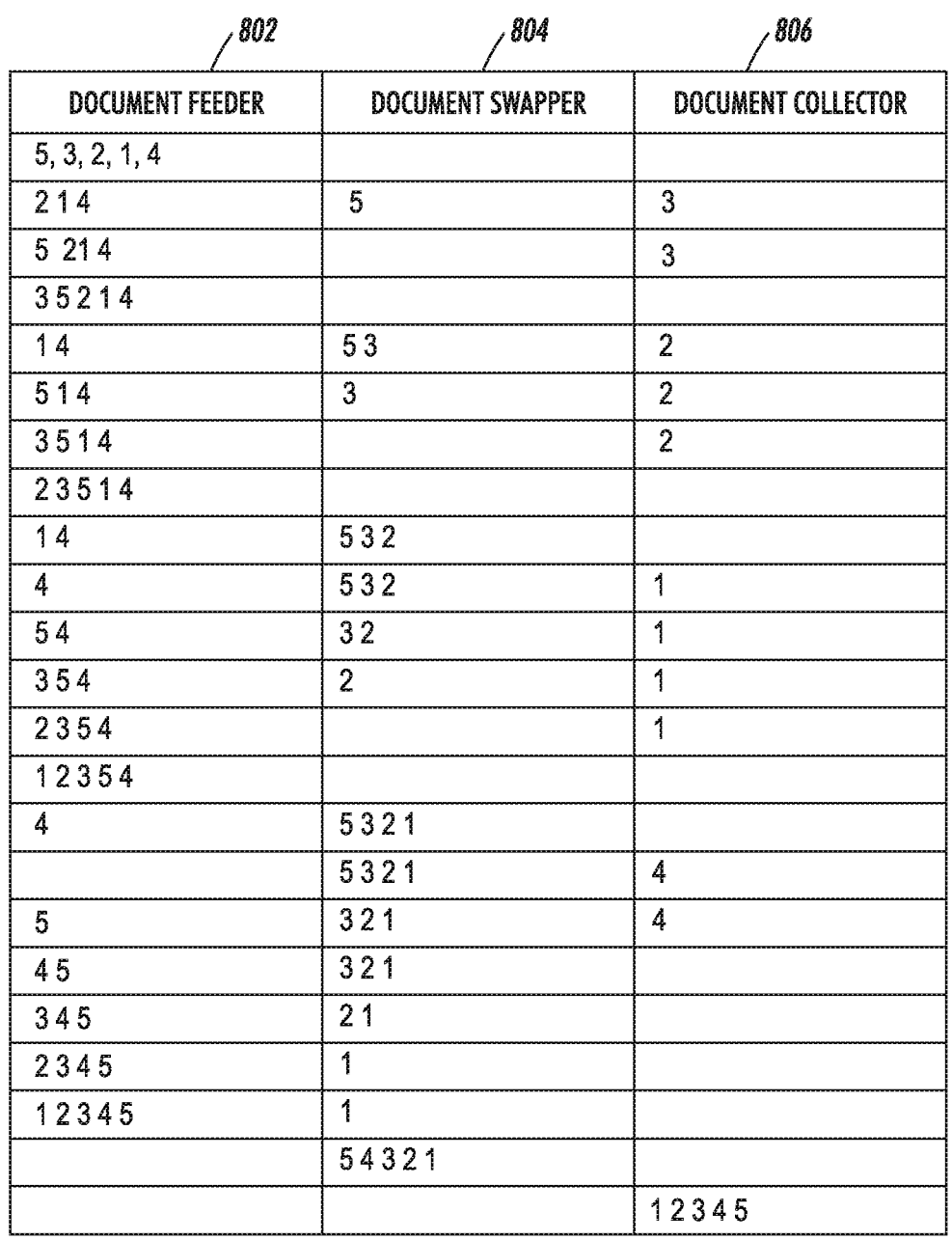
FIG. 8 illustrates a table with a first example for automatically sorting a plurality of pages of a document in an ascending order of page numbers.

FIG. 8 illustrates a table with a first example for automatically sorting a plurality of pages of a document in an ascending order of page numbers. There are five unsorted pages placed in a document feeder 802. The numeric values shown in FIG. 8 correspond to the page numbers. Therefore, the current page number order of the five pages is #5, #3, #2, #1 and #4, wherein #5 is the top most page and #4 is the bottom most page. In an embodiment, the desired order should be #1, #2, #3, #4 and #5, i.e., an ascending order of page numbers. Correlating the example with FIG. 7, the value of A.length in 704 is 5. Therefore, 704 reads as for (1=0; i<=5; i++). In the first swap cycle, one page (top most page, #5) is transferred from the document feeder 802 to a document swapper 804, and the next page (#3, now the top most page in the document feeder 802) is placed in a document collector 806. The page numbers (one or more character fields) of the two pages are compared. Whichever page number is higher, that page is first fed back to the document feeder 802. For example, since #5>#3, page #5 is pulled back to the document feeder 802 from the document swapper 804, followed by page #3. Now the sequence of pages in the document feeder 802 is #3, #5, #2, #1 and #4, wherein #3 is now the top most page. This page number comparison is signified in 718 which reads as If (S[j]>C[0]). In case the desired sorting order was descending, then 718 may read as If (S[j]<C[0]). Since all the pages are back to the document feeder 802, the first swap cycle is complete. In the second swap cycle, top two pages are transferred to the document swapper 804, and the next page is transferred to document collector 806. In FIG. 8, #5 and #3 are placed in the document swapper 804, and #2 is placed in the document collector 806. Page #2 is compared with #3, and #3 is pulled back to the document feeder 802. Next #2 is compared with #5, and #5 is pulled back to the document feeder 802. Finally, #2 is pulled back and the order of pages is now #2, #3, #5, #1, and #4, wherein #2 is now the top most page. Now the second swap cycle is complete. The swap cycles are executed until all scanned pages in the document feeder 802 are sorted and the final sorted pages are sent to the document collector 806. With reference to FIG. 5, the instructions can be explained in terms of N pages and M pages. N pages are a first subset of the scanned pages and is placed in the document swapper 804 in each swap cycle. In an embodiment of the disclosure, the initial value for N is 1 which is then incremented by one for each swap cycle. In another embodiment of the disclosure, the value for N can be varied. M is a second subset of the scanned pages and is placed in the document collector 806. In an embodiment of the disclosure, the value for M is kept as 1 throughout each swap cycle. In another embodiment of the disclosure, the value for M can be varied. The identified sequence of 518 is the sequence in which the pages are swapped in and out of all three plates: the document feeder 802, the document swapper 804, and the document 806. The sequence is depicted in instructions 712-724 of FIG. 7 and can be dynamically ascertained based on the sorting required.

FIG. 9 illustrates a table with a second example for automatically sorting a plurality of pages of a document based on a language code. In this example, the at least one sorting parameter is the language code (one or more character fields) and the desired sequence is French (fr)>Spanish (es)>English (en). The current sequence for the plurality of pages in a document feeder 902 is en, es, en, fr, es, fr, en.

In this case, M pages are placed from the document feeder 902 to a document collector 906. Then N pages are placed from the document feeder 902 to a document swapper 904. A comparison is made between the language codes of the M pages and the N pages, and the pages with similar language codes are retained in the document collector 906, and the rest are pulled back in the document feeder 902. The swap cycle continues until all pages in the document collector 906 are sorted (segregated/grouped) based on the language code.

Method Flowchart 2

Figure 6:
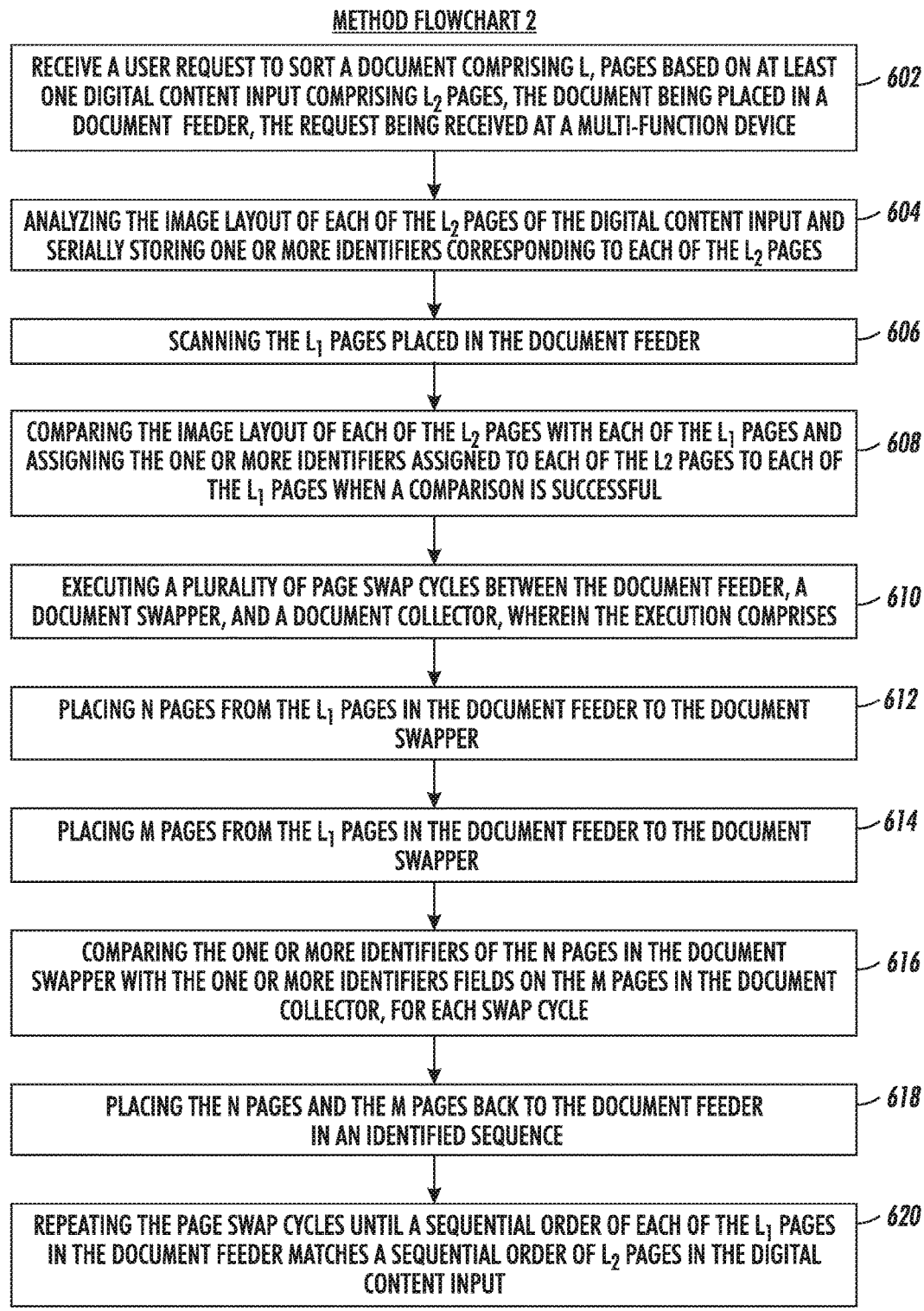
FIG. 6 illustrates a method for automatically sorting a plurality of pages of a document based on at least one digital content input, according to an embodiment of the disclosure.

FIG. 6 illustrates a method for automatically sorting a plurality of pages of a document based on at least one digital content input, according to an embodiment of the disclosure. In an embodiment of the disclosure, a soft copy (digital/electronic) document can be used as a reference to sort the plurality of pages (hard copy/physical sheets). For example, a user provides a digital content input which is a soft copy comprising one or more pages already in a particular order. The user wants to sort a plurality of pages to align with the one or more pages of the soft copy. In other words, a comparison is to be made between the pages of the hard copy and the pages of the soft copy. The digital content input may correspond to any file format. Examples include, but are not limited to, PDF, HTML, PostScript, RTF, GIF, JPEG, TXT, DOC, DOCX, EPUB, PPT, PPTX, XLS, XLSX, Numbers, Pages, Keynote, and the like. FIG. 6 will be discussed with reference to FIG. 2 and FIG. 4, such that the MFD 202 of FIG. 2 corresponds to the MFD 402 of FIG. 4.

At 602, the MFD 402 receives a user request to sort $L_1$ pages (hard copy) of a document based on at least one digital content input comprising $L_2$ pages. Prior to triggering the request, the user places the $L_1$ pages in a document feeder 206 and provides the digital content input to the MFD 402 over the network 112.

At 604, the MFD 402 (specifically the document pre-processing module 408) analyses the image layout of each of the $L_2$ pages of the digital content input and serially stores one or more identifiers corresponding to each of the $L_2$ pages. Examples of the one or more identifiers include, but are not limited to, an image hash value, a numeric value, an alphanumeric string, a code, a string, and one or more language identifiers. The one or more identifiers are used to determine the order of the $L_2$ pages in the digital content input. For example, a page number, a date, a country code, and the like. In an embodiment of the disclosure, an image fingerprint is created for each of the $L_2$ pages, wherein the fingerprint represents the image content as a bit-based hash value. Consequently, an image hash can be used to compare the $L_1$ pages with the $L_2$ pages for the sorting process. Such a scheme may be used when the digital content input is a set of photo identification proofs or other image based data.

At 606, the MFD 402 scans the $L_1$ pages placed in the document feeder 206. In an embodiment of the disclosure, the MFD 402 picks each page from the $L_1$ pages, scans it, and sends it back to the document feeder 206. After the $L_1$ pages are scanned, these are placed back to the document feeder 206 in an order originally placed by the user. In other words, in case the order of the $L_1$ pages get reversed during scanning, the MFD 402 arranges the plurality of pages in the original order. Further, the digital copy of the scanned pages are stored by the MFD 402.

At 608, the MFD 402 compares the image layout of each of the $L_2$ pages with each of the $L_1$ pages and allocates the one or more identifiers assigned to each of the $L_2$ pages to each of the $L_1$ pages when a comparison is successful. The MFD 402 stores the one or more identifiers corresponding to each of the scanned $L_1$ pages in form of an array.

At 610, the MFD 402 executes a plurality of page swap cycles between the document feeder 206, the document swapper 208, and the document collector 210. The execution is performed by the sorting engine 416 of the MFD 402. The specifics of the execution are discussed from 612 to 620.

At 612, the sorting engine 416 places N pages from the $L_1$ pages kept in the document feeder 206 to the document swapper 208. In an embodiment of the disclosure, N=1 for the first swap cycle and is incremented by one for each subsequent swap cycle. In another embodiment, the value for N may vary. In other words, at the start of the page swap cycle, only one page is send from the document feeder 206 to the document swapper 208. In the next cycle, two pages are send, and so on. Further, the pages are picked starting from the top of the stack of $L_1$ pages in the document feeder 206.

At 614, the sorting engine 416 places M pages from the document feeder 206 to the document collector 210. In an embodiment, M=1 for each swap cycle. In another embodiment, the value of M may vary. At 616, the sorting engine 416 compares the one or more identifiers of the N pages in the document swapper 208 with the one or more identifiers of the M pages in document collector 210, for each swap cycle. At 618, the sorting engine 416 places the N pages and the M pages back to the document feeder 206 in an identified sequence. The identified sequence has been discussed with reference to FIG. 7.

At 620, the sorting engine 416 repeats the page swap cycles until a sequential order of each of the $L_1$ pages in the document feeder 206 matches a sequential order of $L_2$ pages in the digital content input. Once all the $L_1$ pages are sorted, the pages are sent to the document collector 210 from where a user can collect the sorted pages.

In an embodiment of the disclosure, the method flow of FIG. 6 may be used to identify one or more missing pages in the $L_1$ pages by comparing with the $L_2$ pages of the digital content input. For example, if the digital content input (softcopy) has six $L_2$ pages in a specific order, however, the $L_1$ pages (hardcopy) are five and unsorted. By using the method flow of FIG. 6, the $L_1$ pages are automatically sorted and then the user can identify which one of the pages was missing.

Experimental Observation and Theoretical Computation

An experiment was conducted to identify mean scanning time taken by a document feeder:

| Scan No. | Time taken (in seconds) |
|---|---|
| 1. | 9.85 |
| 2. | 9.87 |
| 3. | 9.92 |
| 4. | 9.78 |
| 5. | 9.98 |

Average time for scanning using the document feeder=0.988 s/paper

If the number of pages to be sorted is N, then number of iterations required for sorting N pages is 4 N. Based on the above experiment, the time required to scan one page $t_s$=0.988 s (exclusive of the time to perform an optical character recognition).

Further, the time required for swapping two page is $t_{sw}$=0.6 s (this does not involve scanning of the pages). Therefore, the sorting time $t_{sr}$ is:

$$t_{sr}=N(t_s+4t_{sw})$$

The sorting time $t_{sr}$ for sorting 100 pages is:

$$t_{sr}=100(0.988+4\times 0.6)/60 \text{ minutes}$$

$$t_{sr}=5.6\sim 6 \text{ minutes}$$

Therefore, it takes 6 minutes to sort 100 pages by using the document feeder that can take 150 pages/second.

The present disclosure discloses methods and systems for automatically sorting a plurality of pages of a document using a multi-function device (MFD). The assembly of the MFD includes an additional plate: a document swapper which is placed between a document feeder and a document collector. The MFD sorts the plurality of pages in accordance with at least one sorting parameter. Examples of the at least one sorting parameter include, but are not limited to, a page number, a date, a language, a string, a code, and the like. The MFD executes a plurality of page swaps between the document feeder, the document swapper, and the document collector until each of the scanned pages are sorted based on the at least one sorting parameter. The present disclosure simplifies the process of document sorting. A user only needs to place the unsorted/scrambled document into the MFD's document feeder and specify the at least one sorting parameter. Also, the user may specify a multi-tiered sorting. For example, the pages can first be sorted based on date, and then by page numbers. The MFD then automatically sorts or segregates the document, thereby reducing processing time and ensuring higher accuracy.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving," or "determining," or "identifying," "or triggering," or "comparing," or "storing," or "selecting," or "widening," or "strengthening," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the methods may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer-implemented method for automatically sorting a plurality of pages of a document, the method being performed by a multi-function device, the multi-function device comprising a document feeder, a document swapper and a document collector, the method comprising:
    receiving, at the multi-function device, a user request to sort the plurality of pages of the document, the document being placed by a user in the document feeder, wherein the user request comprises at least one sorting parameter;
    scanning, by the multi-function device, the plurality of pages placed in the document feeder;
    identifying, by the multi-function device, one or more character fields corresponding to the at least one sorting parameter in each of the scanned pages, the identification being performed by at least one of an optical character recognition technique and a form awareness technique;
    storing, by the multi-function device, the one or more character fields corresponding to each of the scanned pages;
    executing, by the multi-function device, a plurality of page swap cycles between the document feeder, the document swapper, and the document collector, wherein the page swap cycles are executed by comparing the one or more character fields of each of the scanned pages, wherein the execution comprises:
        placing N pages from the scanned pages in the document feeder to the document swapper;
        placing M pages from the scanned pages in the document feeder to the document collector;
        comparing the one or more character fields of the N pages in the document swapper with the one or more character fields of the M pages in document collector, for each swap cycle;
        placing the N pages and the M pages back to the document feeder in an identified sequence corresponding to the at least one sorting parameter; and
        repeating the page swap cycles until each of the scanned pages are sorted in the document feeder based on the at least one sorting parameter.

2. The computer-implemented method of claim 1, wherein the one or more character fields comprise at least one of a numeric value, an alphanumeric string, a code, a string, and one or more language identifiers.

3. The computer-implemented method of claim 1, wherein the at least one sorting parameter comprises at least one of a page number, a date, a language, a string, and a code.

4. The computer-implemented method of claim 1, wherein the identified sequence is dynamically determined by one or more software instructions executed on the multi-function device.

5. The computer-implemented method of claim 1, wherein the form awareness technique comprises examining a page layout of each of the scanned pages using one or more templates.

6. The computer-implemented method of claim 1, wherein N=1 and N is incremented by one for each swap cycle.

7. The computer-implemented method of claim 1, wherein M=1 for each swap cycle.

8. A system for automatically sorting a plurality of pages of a document by a multi-function device, an assembly of the multi-function device comprising a document feeder, a document collector and an additional document swapper, the system comprising:
- a non-transitory memory storing instructions executable to perform automatically sorting of a plurality of pages of a document by a multi-function device;
- a processor coupled to the non-transitory memory to execute the instructions stored therein;
- a user interface module, coupled to the processor, to receive a user request to sort the plurality of pages of the document, the document being placed by a user in the document feeder, wherein the user request comprises at least one sorting parameter;
- a scan module, coupled to the processor, to scan the plurality of pages placed in the document feeder;
- a document pre-processing module, coupled to the processor, to identify one or more character fields corresponding to the at least one sorting parameter in each of the scanned pages, the identification being performed by at least one of an optical character recognition technique and a form awareness technique;
- a sorting engine, coupled to the processor, to execute a plurality of page swap cycles between the document feeder, the document swapper, and the document collector until each of the scanned pages are sorted based on the at least one sorting parameter, wherein a bi-directional flow of the plurality of pages is facilitated between each of the document feeder, the document swapper, and the document collector; and
- a memory module, coupled to the processor, to store the one or more character fields corresponding to each of the scanned pages.

9. The system of claim 8, wherein the document pre-processing module further comprises an optical character recogniser and a form awareness module.

10. The system of claim 8, wherein the sorting engine executes one or more software instructions for the plurality of swap cycles.

11. The system of claim 10, wherein the one or more software instructions are stored in the memory module.

12. The system of claim 10, wherein the one or more software instructions are received from a server.

13. The system of claim 8, wherein the user request further comprises one or more templates.

14. The system of claim 8, wherein the document feeder, the document swapper, and the document collector are joined using one or more motor-wheel assembly.

15. A system for automatically sorting a plurality of pages of a document by a multi-function device, an assembly of the multi-function device comprising a document feeder, a document collector and an additional document swapper, the system comprising:
- a non-transitory memory storing instructions executable to perform automatically sorting of a plurality of pages of a document by a multi-function device;
- a processor coupled to the non-transitory memory to execute the instructions stored therein;
- a user interface module, coupled to the processor, to receive a user request to sort the plurality of pages of the document, the document being placed by a user in the document feeder, wherein the user request comprises at least one sorting parameter;
- a scan module, coupled to the processor, to scan the plurality of pages placed in the document feeder;
- a document pre-processing module, coupled to the processor, to identify one or more character fields corresponding to the at least one sorting parameter in each of the scanned pages, the identification being performed by at least one of an optical character recognition technique and a form awareness technique;
- a memory module, coupled to the processor, to store the one or more character fields corresponding to each of the scanned pages; and
- a sorting engine, coupled to the processor, to execute a plurality of page swap cycles between the document feeder, the document swapper, and the document collector, wherein the page swap cycles are executed by comparing the one or more character fields of each of the scanned pages, wherein the execution comprises:
  - placing N pages from the scanned pages in the document feeder to the document swapper;
  - placing M pages from the scanned pages in the document feeder to the document collector;
  - comparing the one or more character fields of the N pages in the document swapper with the one or more character fields of the M pages in document collector, for each swap cycle;
  - placing the N pages and the M pages back to the document feeder in an identified sequence corresponding to the at least one sorting parameter; and
  - repeating the page swap cycles until each of the scanned pages are sorted in the document feeder based on the at least one sorting parameter.

* * * * *